Figure 3:
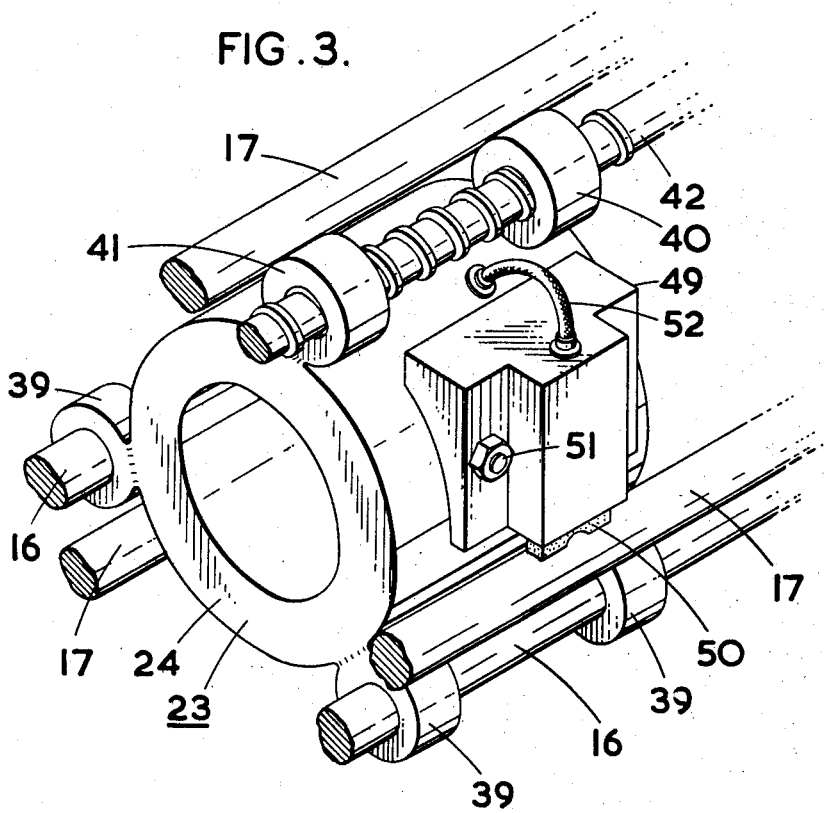

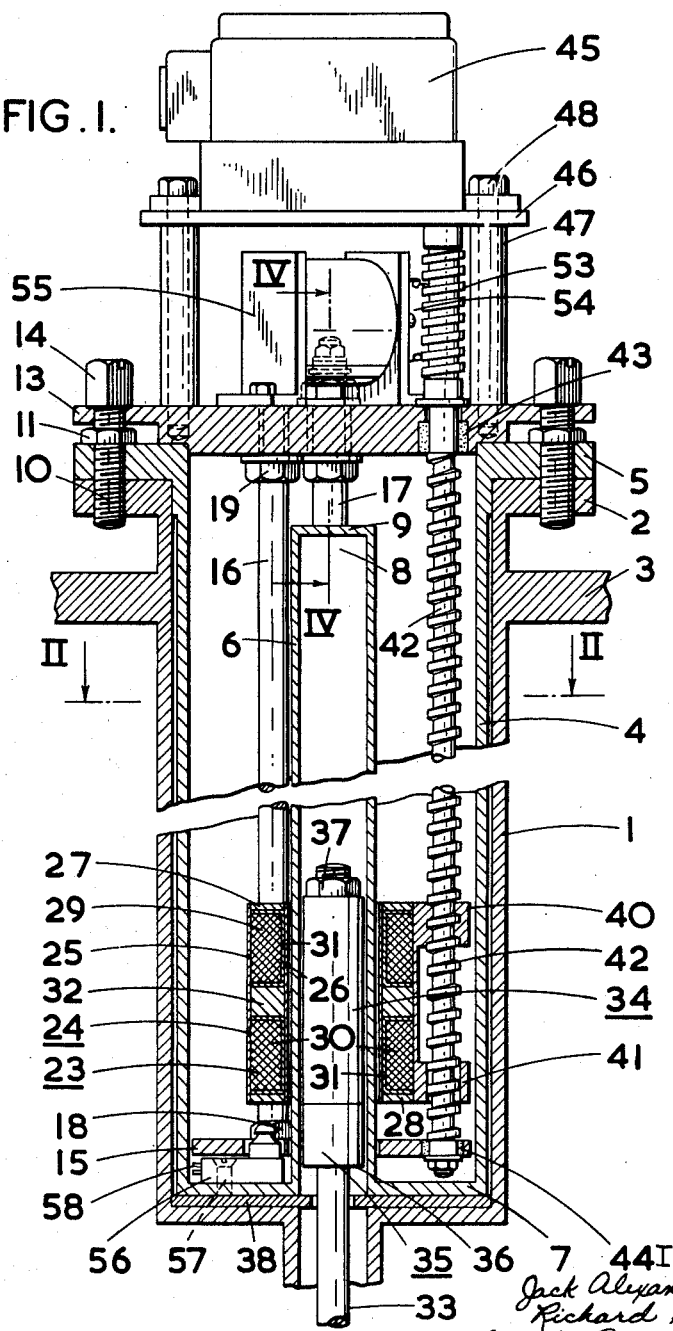

Oct. 22, 1963   J. A. GOLDER ET AL   3,108,213
POSITION INDICATING DEVICES
Filed March 28, 1960   3 Sheets-Sheet 2
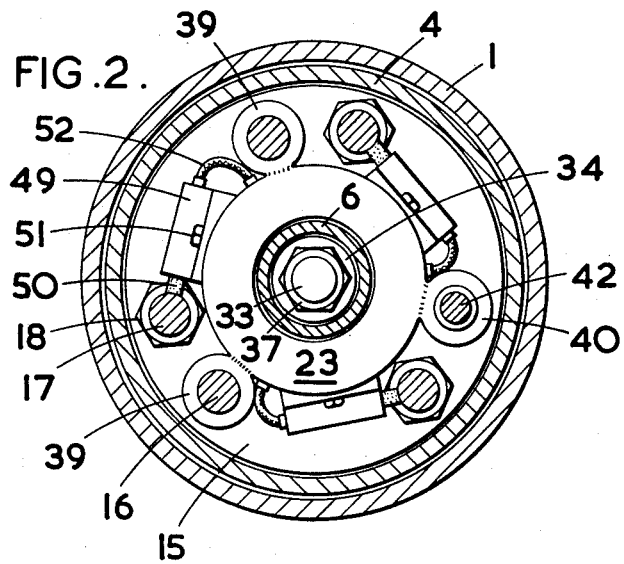
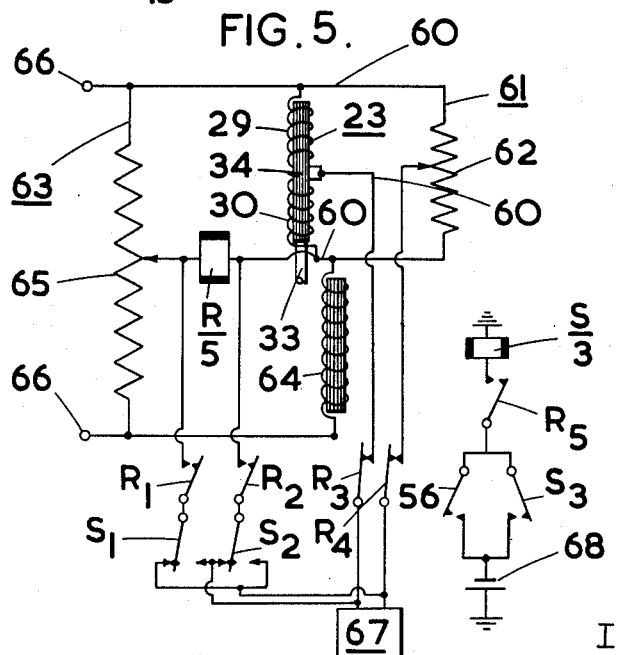
INVENTORS
Jack Alexander Golder
Richard Smart
Joseph Raymond Pendleton
BY
Larson and Taylor

3,108,213
POSITION INDICATING DEVICES
Jack Alexander Golder, Appleton, near Warrington, Richard Smart, Urmston, Manchester, and Joseph Raymond Pendleton, Stretford, Manchester, England, assignors to United Kingdom Atomic Energy Authority, London, England
Filed Mar. 28, 1960, Ser. No. 18,013
Claims priority, application Great Britain Mar. 31, 1959
3 Claims. (Cl. 318—28)

This invention relates to position indicating devices and has one application to meeting the requirement of locating the position of a member in a sealed body by means of apparatus outside the body.

Proposals to date for meeting the above requirement include radiation devices wherein a radio-active source is attached to the member and the position of this source is detected by apparatus outside the sealed body. Other devices include those employing change of inductance effects and electrical contact devices. Radiation devices suffer from lack of sensitivity, introduce the dangers of radio-activity and in their application to nuclear reactors their discrimination can be effected by radiation from the reactor. Electrical contact devices are not reliable enough to be placed in any position where maintenance cannot be readily carried out such as in a nuclear reactor.

Devices employing change of inductance effects are more attractive as there is a minimum of parts requiring maintenance contained within the sealed body. A known form of inductance device for location of a movable member comprises a part of magnetic material carried by the movable member so that with movement of the movable member the part of magnetic material is inserted into and withdrawn from a long cylindrical coil. In such a device both the part of magnetic material and the cylindrical coil have to be the full length of the range of movement of the movable member. Good accuracy of reading can only be sustained with constant temperature along the length of the cylindrical coil as changes in temperature affect the electrical characteristics of the coil on which the accuracy relies.

Another device relying on change of inductance effects employs a differentially wound double coil which is movable to follow the movement of a member of magnetic material so that the movement of the coil takes it to an equilibrium position relative to the member of magnetic material such that a condition of electrical balance exists in a circuit in which the coil is embodied. When the coil and member of magnetic material occupy relative positins such that a condition of out of balance exists in the circuit an output derived from the circuit is used to energise means for moving the coil to the equilibrium position relative to the member of magnetic material. This device operates satisfactorily so long as the movement of the member of magnetic material is not too rapid. Rapid movement of the member of magnetic material can take it completely out of the coil and in this condition the circuit is in a condition of electrical balance and no output can be derived from the circuit to energise the means for driving the coil to follow the movement of the member of magnetic material.

According to the invention an electrical position indicating device relying on change of inductance effects employs a differentially wound double coil which is movable to follow the movement of a member of magnetic material such that with the member of magnetic material occupying one position in the coil a condition of electrical balance exists in a circuit including said coil and at other positions of the member of magnetic material a condition of electrical unbalance exists in the circuit and an output derived from said circuit is employed to energise means for moving the coil relative to the member of magnetic material to the position such that a condition of electrical balance is restored in said circuit characterised in that said differentially wound coil is included in a second circuit such that should said member of magnetic material move completely out of the differentially wound coil thus leaving the first circuit in balance, a condition of electrical unbalance exists in said second circuit and an electrical output derived from said second circuit is used to energise means for moving the coil to relocate it about the member of magnetic material.

Figure 4:
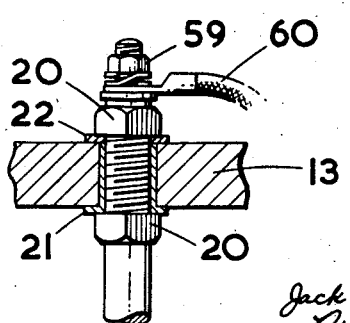

One embodiment of the invention for use in providing indication of the position of a control rod in a nuclear reactor will now be described by way of example with reference to the accompanying drawings in which:

FIG. 1 is a partial longitudinal sectional elevation.
FIG. 2 is a cross sectional elevation along the line II—II of FIG. 1.
FIG. 3 is an isometric detail.
FIG. 4 is a detail along the line IV—IV in FIG. 1.
FIG. 5 is an electrical circuit diagram.

As shown in FIGS. 1 and 2 the device comprises a tubular housing 1 having an external end flange 2 and formed integral with a plate 3 which is part of the basic structure of a nuclear reactor. A tube 4 having an external flange 5 is located within the housing 1 and is formed integral with an inner concentric tube 6 and an annular base plate 7. The tube 6 is closed at its internal end 8 by a plate 9. The housing 1 and the tube 4 are secured together at the flanges 2 and 5 by eight threaded studs 10 locked by nuts 11. The studs 10 also locate a circular end plate 13 which is secured by nuts 14 on the studs 10. An annular plate 15 is supported between the tubes 4 and 6 by two guide rods 16 and three contact bars 17 which span between the plates 13 and 15. The plate 15 which is made of electrically insulating material is secured to the guide rods 16 and the contact bars 17 by nuts 18. The guide rods 16 are screwed into the end plate 13 and secured by nuts 19. As shown in FIG. 4 the contact bars 17 are secured to the plate 13 by nuts 20 and are electrically insulated with respect to the plate 13 by a flanged tubular insert 21 and a washer 22 both made of electrically insulating material. A double wound coil 23 located embracing the tube 6 above the plate 15 comprises a casing 24 including outer and inner tubular sleeves 25 and 26 welded between end plates 27 and 28. The casing 24 contains two windings 29 and 30 on brass spools 31 fitted about the inner sleeve 25. The windings 29 and 30 are separated by a central annular ring 32 of material having a high magnetic susceptibility. A rod 33, attached to a member whose position is to be indicated (viz. in this case a control rod assembly of the nuclear reactor), projects through the base of the tubular housing into the tube 6. The rod 33 carries a slug 34 of magnetic material and a sleeve 35 of non-magnetic material such as stainless steel. The sleeve 35 bears against a step 36 in the rod 33 and the slug 34 is held between the sleeve 35 and a nut 37 on the end of the rod 33. The downward movement of the rod 33 is limited by the sleeve 35 contacting an annular plate 38 held between the base of the tubular housing 1 and the plate 7.

As shown in FIG. 3 the double wound coil 23 is movable along the length of the tube 6 on the two guide rods 16. The coil 23 is supported by bushes 39 brazed to the casing 24 and slidable on the guide rods 16. Two bushes 40 and 41 also brazed to the casing 24 co-operate with a threaded shaft 42 rotatable in bearing bushes 43 and 44 fitted in the plates 13 and 15. The bush 40 is internally threaded to fit the threaded shaft 42 while the bush 41 is a sliding fit on the shaft 42. The shaft 42 projects through the plate 13 and is connected to be driven by a motor 45 mounted on a plate 46 above the plate 13. The plate 46 is supported by four tubular pillars 47 and secured by bolts 48. Three contact blocks 49 fitted with spring loaded graphite contacts 50 are fixed to the casing 24 of the double wound coil 23 by bolts 51. The contacts 50 are in sliding contact with the contact bars 17 and are connected by leads 52 with the windings 29 and 30 of the double wound coil 23. The shaft 42 is connected by a worm 53 and a worm wheel 54 to drive a "Magslip" position indicator 55 mounted on the plate 13 below the plate 46. A limit switch 56 operated by the coil 23 when it reaches its bottom position is fixed to the annular base plate 7 by bolts 57. Leads 58 from the switch 56 pass to the outside of the reactor. As shown in FIG. 4 terminals 59 for leads 60 are provided at the external ends of the contact bars 17.

As shown in FIG. 5 the coil 23 is electrically connected by the contact bars 17 and the leads 60 in an A.C. energised bridge 61. The coil 23 forms two adjacent arms of the bridge 61 which is normally balanced when the slug 34 is fully contained within the coil 23. The A.C. bridge 61 comprises the two windings 29 and 30 forming the coil 23 and a potentiometer 62.

The double wound coil 23 also forms one arm of a further A.C. bridge 63 including a potentiometer 65 and a coil 64, having an iron core. Input terminals 66 are provided at each end of the potentiometer 65. A relay R having contacts $R_1$, $R_2$, $R_3$, $R_4$ and $R_5$ (shown using the conventional detached contact system with the contacts in the unoperated condition) is connected across the output of the D.C. bridge 63. The A.C. bridge 61 is connected with a phase sensitive servo-amplifier 67 through the normally closed contacts $R_3$ and $R_4$. The servo-amplifier 67 when energised by out of balance in the bridge 61 due to movement of the slug 34 feeds the motor 45 (FIG. 1) to rotate the shaft 42 and drive the coil 23 either up or down to follow the movement of the slug 34 and rebalance the bridge 61. When the relay R is operated by a substantial out of balance in the bridge 63 the output of the bridge 63 is connected with the servo-amplifier 67 through the contacts $R_1$ and $R_2$ and through contacts $S_1$ and $S_2$ of a relay S to energise the servo-amplifier 67 and drive the motor 45 in a direction governed by the position of the contacts $S_1$ and $S_2$ and a self holding contact $S_3$ also governed by the relay S. The relay S is energised from a D.C. supply 68 when the contact $R_5$ is closed and the limit switch 56 is operated. The contact $S_3$ is provided to hold the relay S operated until contact $R_5$ releases.

In use of the device the position of the double wound coil 23 is related to the position of the control rod assembly. Under stable conditions the control rod assembly is stationary and the coil 23 is located fully embracing the slug 34 as shown in FIG. 1. The "Magslip" indicator 55 gives indication of the position of the coil 23 and hence of the position of the control rod assembly. With the slug 34 fully contained within the coil 23 and a voltage of about 50 volts A.C. applied across the terminals 66 the bridges 61 and 63 are balanced and the servo-amplifier 67 receives zero input voltage. Consider now that the control rod assembly is moved slowly up or down, then the rod 33 and the slug 34 move with the assembly and the slug 34 is moved slowly relative to the coil 23. With this relative up or down movement the A.C. bridge 61 becomes unbalanced and the servo-amplifier 67 is energised by the output of the bridge 61 through the contacts $R_3$ and $R_4$ to drive the motor 45. The output of the bridge 61 is phase sensitive so that the motor 45 drives the coil 23 to follow the movement of the slug 34 until the bridge 61 is again balanced when the coil 23 is again located embracing the slug 34. The rotation of the shaft 42 to move the coil 23 produces a corresponding rotation of the "Magslip" position indicator 55 through the worm 53 and the worm wheel 54 thus providing indication of the new position of the econtrol rod assembly.

If for any reason the control rod assembly is moved rapidly downwards so that the slug 34 is removed completely from the coil 23 the bridge 61 remains balanced and no signal is received by the servo-amplifier 67 to cause the coil 23 to be driven to follow the movement of the slug 34. However, complete removal of the slug 34 from the coil 23 brings about unbalance of the bridge 63, the output of which operates the relay R so that the contacts $R_1$ and $R_2$ are closed and the contacts $R_3$ and $R_4$ are opened. Thus the output of the bridge 63 is fed to the servo-amplifier 67 through the contacts $R_1$ and $R_2$ and the changeover contacts $S_1$ and $S_2$ of the relay S. The servo-amplifier 67 is energised by the output of the bridge 63 to drive the coil 23 downwards to follow the downwards movement of the slug 34 until the coil 23 is again located embracing the slug 34 when both bridges 61 and 63 are again balanced. At this point the motor 45 ceases to drive and the relay R returns to the condition shown in FIG. 5.

Should the control rod assembly move rapidly upwards so that again the slug 34 is completely removed from the coil 23, the output of the bridge 63 again energises the relay R and the servo-amplifier 67 is energised through the contacts $R_1$ and $R_2$ and the change over contacts $S_1$ and $S_2$ to drive the coil 23 downwards in the opposite direction to the movement of the slug 34. Operation of the relay R also closes the contact $R_5$ and the limit switch 56 is closed by the coil 23 as it reaches the bottom limit position. Thus the relay S is energised causing the contacts $S_1$ and $S_2$ to be changed over and the contact $S_3$ to be closed to hold the relay S operated. Thus the feed to the servo-amplifier 67 from the bridge 63 is reversed and the coil 23 is driven upwards from the bottom limit position towards the slug 34. When the coil 23 is again located embracing the slug 34 the output of the bridge 63 falls to zero and the relay R is de-energised and returns to the condition shown in FIG. 5. Thus the contact $R_5$ of the relay R is opened, the relay S is de-energised and returns to the condition shown in FIG. 5.

The device has other applications than the application to nuclear reactors described above. For example the slug 34 can be encased in a polythene float which is held in a side arm connecting with a tank holding liquid. Thus the float follows the level of liquid in the side arm which is related to the level of liquid in the tank and can be followed by a coil embracing and movable along the side arm of the tank. In another application the device can be used to follow the movement of the metal float in a "Rotameter" type flowmeter.

We claim:

1. In combination with a position indicating device of the kind comprising a member of magnetic material movable in differentially wound coils to give an error signal from a bridge circuit, including said differentially wound coils, when the member of magnetic material and said differentially wound coils are unsymmetrically disposed with respect to one another, means for moving said differentially wound coils servowise according to the error signal to restore the coils to a position symmetrical with the member of magnetic material, the added feature of a second balancing bridge circuit having said differentially wound coils together as one arm thereof, said second balancing bridge circuit being balanced when the member of magnetic material is in the coils and unbalanced when the member of magnetic material is completely outside the coils, means for detecting the unbalance in said second balancing bridge circuit, and means for driving the coils to restore balance in said second balancing bridge circuit.

2. Position indicating equipment comprising a first A.C. bridge circuit having in each of two adjacent arms an inductively wound coil, a member of magnetic material, whose position is to be indicated, movable in said coils, output connections from said first A.C. bridge circuit, a phase sensitive servo-amplifier connected across said output connections, a motor connected to be driven by the output of said amplifier, a mechanical connection from said motor to said coils to move the coils to follow said member of magnetic material, a second A.C. bridge circuit having as one arm both of said coils and as a balancing arm a third inductively wound coil balancing with the other coils when the member of magnetic material is in said other coils and unbalanced with the other coils when the member of magnetic material is completely outside the other coils, output connections from said second bridge circuit, relay means sensitive to out of balance output of said second bridge circuit and switch means operated by said relay in the output connections from both first and second bridge circuit for switching said servo-amplifier from connection with the first bridge circuit to connection with the second bridge circuit.

3. Position indicating equipment as claimed in claim 2 having a contactor at the one end of the path of travel of said other coils and further switch means causing reversal of the connections to said motor and hence reversal of the direction in which said other coils are driven.

References Cited in the file of this patent
UNITED STATES PATENTS 2,349,963     Harrison _____ May 30, 1944